(12) United States Patent
Mueller et al.

(10) Patent No.: US 6,221,988 B1
(45) Date of Patent: Apr. 24, 2001

(54) POLYMERIZABLE COATING COMPOSITION WHICH IS SCRATCH-WEATHER-AND SOIL-RESISTANT

(75) Inventors: Michael Mueller, Bensheim; Rolf Neeb, Pfungstadt, both of (DE)

(73) Assignee: Roehm GmbH Chemische Fabrik, Darmstadt (DE)

( * ) Notice: Subject to any disclaimer, the term of this patent is extended or adjusted under 35 U.S.C. 154(b) by 0 days.

(21) Appl. No.: 08/257,139

(22) Filed: Jun. 9, 1994

(30) Foreign Application Priority Data

Jun. 9, 1993 (DE) ................................................ 43 19 199

(51) Int. Cl.$^7$ .................................................. C08F 228/02
(52) U.S. Cl. ........................................ 526/243; 428/411.1
(58) Field of Search ............................................... 526/243

(56) References Cited

U.S. PATENT DOCUMENTS

| | | | |
|---|---|---|---|
| 3,950,298 | * 4/1976 | McCown | 526/243 |
| 5,128,387 | 7/1992 | Shustack . | |

FOREIGN PATENT DOCUMENTS

| | | |
|---|---|---|
| 2 164 716 | 7/1972 | (DE) . |
| 24 55 715 | 5/1975 | (DE) . |
| 29 28 512 | 1/1981 | (DE) . |
| 0 040 923 | 12/1981 | (EP) . |
| 0 576 247 | 12/1993 | (EP) . |
| 1 262 526 | 2/1972 | (GB) . |

OTHER PUBLICATIONS

Chemical Abstracts, vol. 107, 1987, p. 93, AN 135968v, JP 61,258,870, Nov. 17, 1986.

Chemical Abstracts, vol. 110, 1989, pp. 104–105, AN 97285x, JP 63,196,667, Aug. 15, 1988.

Chemical Abstracts, vol. 88, 1978, p. 71, AN 52095w, JP 77,105,936, Sep. 6, 1977.

Chemical Abstracts, vol. 104, 1986, p. 52, AN 69939w, JP 60,151,601, Aug. 9, 1985.

\* cited by examiner

*Primary Examiner*—Christopher Henderson
(74) *Attorney, Agent, or Firm*—Oblon, Spivak, McClelland, Maier & Neustadt, P.C.

(57) ABSTRACT

The invention relates to a coating composition, a method of coating molded articles with the coating composition, and the molded articles so coated, particularly molded articles of thermoplastic or thermoelastic polymers. The coating, in the form of a cured thin layer, is particularly clear, scratch resistant, and weather-resistant. It is produced on the plastic substrate material by polymerization of a layer of flowable coating comprised of the coating composition, which layer is essentially comprised of monomers comprised of polyfunctional (meth)acrylic compounds. The coating is distinguished by good anti-soiling and anti-graffiti characteristics. These characteristics are brought about by the co-use of polymerizable (meth)acrylic compounds which contain fluorinated alkyl groups and which have the formula

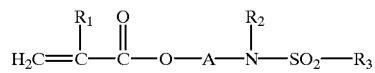

where $R_1$ represents H or $CH_3$;

A represents an alkylene group with 2–6 carbon atoms;

$R_2$ represents H or an alkyl group with 1–4 carbon atoms; and $R_3$ represents a fluorine-containing alkyl group with 2–20 carbon atoms.

5 Claims, No Drawings

POLYMERIZABLE COATING COMPOSITION WHICH IS SCRATCH-WEATHER-AND SOIL-RESISTANT

BACKGROUND OF THE INVENTION

1. Field of the Invention

The invention relates to flowable coating compositions for producing scratch-resistant coatings (SRCs), based on multifunctional acrylates and methacrylates, and a method of coating molded articles, particularly articles comprised of plastics, such as organic glasses, with a particularly clear coating in the form of a hardened thin layer which arises from polymerization of essentially polyfunctional acrylic and/or methacrylic compounds, which coating is distinguished by high scratch-resistance even under conditions of open-air weathering, and which coating has an oil- and water-repellent action.

2. Discussion of the Background

According to German laid-open applications DE 21 64 716 and DE 24 55 715, multifunctional acrylate systems can be polymerized with thermally decomposable polymerization initiators, the usual oil soluble peroxides and azo compounds; or by initiation by irradiation, for example, by UV radiation acting in the presence of suitable photoinitiators.

Preferably UV-initiation is used, because the method can be carried out in the presence of air. According to German laid-open application DE 29 28 512, an SRC with improved adhesion results if such a UV polymerization is carried out between 70° C. and the glass temperature of the plastic to be coated.

Peroxide initiation is known for production of coated, scratch-resistant plates with good weather-resistance. According to European Patent EP-B 0 245 728, the coating uses aliphatic peroxydicarbonates as peroxide initiators.

UV-hardenable SRCs formed from acrylic resins with added fluoroalkyl-group-containing (meth)acrylate comonomers are known from the following three Japanese patent publications:

Japanese Patent 63-196,667 (ref. CA 110:97285), discloses a coating for PC screens, wherein the SRC agents consist of the following, in a solvent mixture:

(a) 10–60% of (meth)acrylic acid esters of formula $$H_2C=C(R)CO_2CH_2R_f,$$

where R represents H or $CH_3$, and $R_f$ represents a fluoroalkyl group with 1–20 C atoms; and (b) polyfunctional acrylates;

Japanese Patent 60-151,601 (ref. CA 104:69,939), discloses coatings for plastic lenses comprised of polydiallyl compounds, wherein employed is a butylmethylketone solution containing polyfunctional acrylates and dihydroperfluorohexyl acrylate in a weight ratio of 55:45; and Japanese Patent 77-105,936 (ref. CA 88:52,095), discloses coatings of polymethacrylate lenses, wherein employed is a flowable coating resin comprised of polyfunctional acrylic esters, methyl methacrylate, and 1 wt. % of hexafluoropropyl methacrylate based on the weight of the monomers. The fluorine-containing comonomers confer improved optical properties and improved surface smoothness on the hard coating of the polymethacrylate lens.

European published Application EP-A-40 923 discloses radiation-hardenable mixtures of substances which form strongly adhering polymer coatings, wherein the coating mixtures are composed of polyethylenically unsaturated and crosslinking substances, a film-forming polymer, and a polyfluorinated acrylate, wherein the fluorinated compound may particularly have the formulae $$H_2C=C(R)CO_2(CH_2)_{1-12}R_f \quad\quad\quad (A)$$

or

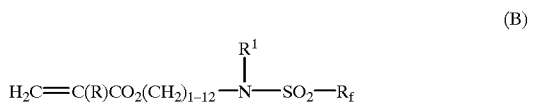
(B)

where R represents H or $CH_3$, $R^1$ represents H or an alkyl group with 1–4 carbon atoms, and $R_f$ represents a polyfluorinated alkyl group with 6–20 carbon atoms. B may be, for example, N-ethyl-heptadecafluorooctane-sulfonamidoethyl acrylate.

Coating compositions for PMMA plates are disclosed in Japanese Patent 61-258,870 (ref. CA 107:135,968), composed of diacrylate, epoxyacrylate, and fluoroalkyl-group-containing methacrylates such as represented by formulas (A) and (B) in the preceding paragraph with reference to European Published Application EP-A-40 923. These compositions do not allow production of hard and scratch—resistant coatings.

Plastic molded bodies which have SRCs are particularly employed in the form of plates on building exteriors, for example, on sound-protecting walls or as glazing panels of facades, bus stop enclosure walls, advertising panels, advertising pillars, and so-called "urban furniture". In such uses the coatings may be particularly subject not only to natural soiling but to soiling of direct human origin via vandalism, e.g. graffiti. It is very costly to clean such surfaces repeatedly without at least some invasion of the surface, for example, as physical abrasion.

OBJECTS OF THE INVENTION

An object of the present invention was to devise flowable coating compositions for the chemical- and solvent-resistant coating of molded articles, which coatings have surfaces which have very low adhesion to subsequently applied particles such as soils or subsequent coatings containing pigment particles, e.g. via spray nozzles.

SUMMARY OF THE INVENTION

Surprisingly, it was discovered, that highly scratch-resistant and very weather-resistant coatings for plastic molded articles, having substantially improved cleanability, may be obtained from multifunctional (meth)acrylate monomers and mixtures of such monomers, along with surface-active comonomers, polymerized in the presence of azo compounds or peroxides as initiators or, particularly, polymerized with initiation via UV radiation in the presence of customary photoinitiators. According to the invention, the polymerizable multifunctional monomer mixture contains, as surface active comonomers, 0.1–20 wt. %, preferably 0.1–10 wt. %, and particularly 0.5–5 wt. % of fluorinated-alkyl-group-containing (meth)acrylate monomers of formula

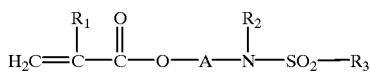

where $R_1$ represents H or $CH_3$;

A represents an alkylene group with 2–6 carbon atoms;

$R_2$ represents H or an alkyl group with 1–4 carbon atoms; and $R_3$ represents $C_aH_bF_c$, where a, b, and c are integers and a=2–30; b=0–4; c=2a+1–b.

The molded article coating obtained has a low surface energy, substantially decreasing the adhesion of coatings, soils, etc.

It was further surprisingly discovered, that outstanding leveling composition qualities are provided by fluorinated-alkyl-group-containing (meth)acrylate monomers of formula

II

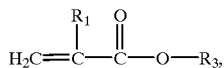

where $R_1$ represents H or $CH_3$; and $R_3$ represents $C_aH_bF_c$, where a, b, and c are integers, and a=2–20; b=0–4; c=2a+1–b;

in amounts of 0.5–40 wt. %, particularly 1–20 wt. % based on the total weight of the polymerizable components contained in the coating composition. Compound II must be present in the coating composition when the coating composition is applied. After the curing of the inventive coating composition by polymerization, the substances serving as leveling compositions are chemically bound within the polymer coating and are not capable of migrating, in contrast to the customarily used nonpolymerizable leveling compositions.

DESCRIPTION OF THE PREFERRED EMBODIMENTS

The invention relates to coating compositions for producing a scratch-resistant and weather-resistant coating on a molded article, by application of a flowable coating composition having radically polymerizable crosslinking monomers and/or reactive oligomers, these monomers and/or oligomers having at least two polymerizable carbon-carbon double bonds, in admixture with additional monomers containing a polymerizable double bond, and customary additives, and curing of the coating by polymerization; wherein the coating composition contains one or more fluorinated-alkyl-group-containing (meth)acrylate monomers, of low surface energy, which monomers have the formula

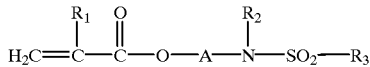

where $R_1$ represents H or $CH_3$;

A represents an alkylene group with 2–6 carbons atoms;

$R_2$ represents H or an alkyl group with 1–4 carbons atoms; and $R_3$ represents $C_aH_bF_c$, where a=2–20; b=0–4; c=2a+1–b;

and which monomers are present in the amount of 0.1–20 wt. % (based on the total weight of the polymerizable components contained in the coating composition).

In a particularly preferred embodiment, the coating compositions contain combinations of fluorinated-alkyl-group-containing (meth)acrylate monomers having the following formulas:

I

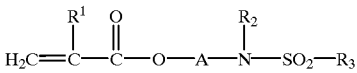

II

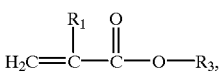

where $R_1$, A, $R_2$, and $R_3$ have the same meanings as immediately above.

The novel coatings have, in addition to scratch-resistance and weather resistance, other properties, in particular anti-soiling and anti-graffiti characteristics, which improve the self-cleaning nature of molded articles and enable improved removal of spray paints from such articles. These characteristics are advantageous for example, for the cleaning care of sound protection panels, advertising panel glazing, advertising columns, etc.

The Xeno test of weathering (DIN 53387) shows that the inventive coatings on articles such as extruded acrylic glass, have good weather resistance.

It was further discovered that the weather-resistance of the inventive plastic molded articles bearing anti-soiling and anti-graffiti coatings produced with the polyfunctional (meth)acrylate compositions of the subject invention can be further substantially improved by the use of UV-protective compositions and anti-aging compositions, particularly UV-protective compositions which are polymerizable.

The subject invention coating compositions and the coatings produced therefrom are essentially comprised of:

(a) ≧30 wt. % of a polyfunctional (meth)acrylate compound, (b) 0.1–20 wt. % of a fluorinated-alkyl-group-containing (meth)acrylate monomer of formula I, (c) <30 wt. % of a second copolymerizable compound, and (d) customary additives.

Comparisons of the scratch resistance of the subject invention coatings with known scratch-resistant coatings (SRCS) based on polyacrylates or polysiloxanes on plastic substrates show that the novel coatings have good scratch resistance, and especially, greater cleanability. The manufacture of the polyacrylate coatings has practical advantages in that the coatings cure thoroughly in a matter of seconds to minutes, whereas polysiloxane coatings require several hours to cure at comparable curing temperatures.

A particular advantage of the inventive coating is that the subject SRC with anti-soiling and anti-graffiti qualities adheres to practically any substrate. Thus, with activating pre-treatment, the coating may even be used to coat plastics such as polyethylene and polypropylene which are normally very difficult to coat.

The SRC is applicable to molded articles in general, particularly advantageously to plastic molded articles which have hard glossy surfaces which are susceptible to scratching. Among the plastics which have low surface hardness are those which have little or virtually no crosslinking, and which can be processed to form molded articles while in a thermoplastic or thermoelastic state. Non-limiting examples are polymethyl methacrylate (PMMA); copolymers of methyl methacrylate with additional (meth)acrylic compounds, for example, acrylonitrile with 60 wt. % of methyl methacrylate; polystyrene; high impact styrene mixed polymers; polyethylene; polypropylene; polyvinyl chloride; cellulose; or polycarbonates based on bisphenol A.

To reduce natural and imposed soiling, molded articles are coated with coatings which adhere less to soils and paints and the like, yet retain scratch resistance characteristics.

The inventive coating for plastics is generally applied to the molded article in the article's final form, for example, to a finished injection molded part, because the highly crosslinked, scratch resistant coating is not thermoplastically or thermoelastically deformable. The coating allows some but only limited elastic flexure of the plastic molded article. In a preferred embodiment of the invention, flat plates or continuously manufactured flat strip, hollow profile plate, or film, is coated, the coating process directly following the extrusion, preferably in a continuous process. In a particularly preferred embodiment, injection molded articles manufactured in large serial production are coated.

Coating compositions which according to the invention cure to form highly crosslinked, scratch-resistant and weather-resistant coatings, contain as essential components up to 60 wt. % of one or more fluorinated-alkyl-group-containing (meth)acrylate monomers of formula I, or formulas I and II, and one or more radically polymerizable (meth)acrylic compounds with at least two (and preferably three or more) polymerizable carbon double bonds. The preferred tri- or higher functional monomers are acrylate esters of tri- or higher hydric alcohols such as glycerin, 2,2-di(hydroxymethyl)-1-butanol (trimethylolpropane, TMP), 1,2,4-butanetriol, 1,2,6-hexanetriol, pentaerythritol, diglycerol, or dipentaerythritol. Preferred polyfunctional monomers are TMP triacrylate, pentaerythritol triacrylate and/or pentaerythritol tetraacrylate, and 1,2,6-hexanetriol triacrylate. The proportion of methacrylic groups in relation to acrylic groups in the (meth)acrylic monomers should be kept as low as possible. Preferably, methacrylic monomers should represent $\leq 30$ wt. %. One may also use, as polymerizable (meth)acrylic compounds in the coating composition, reactive, advantageously polyfunctional, oligomers, e.g. urethane di- or triacrylates or corresponding ester acrylates.

In addition to the monomers designated as essential, the addition of other monomers having one or two radically polymerizable double bonds confers advantages in the handling of the generally highly viscous tri- and multifunctional monomers and oligomers, and in the cured properties of the coating, for example, improved flexibility. Examples of candidates for use as monomers with a single polymerizable double bond are styrene, acrylonitrile, and (meth)acrylates with 1–10 carbon atoms in the ester group, these (meth)acrylates optionally substituted with, e.g., OH groups, in the ester moiety. Particularly preferred are monomers with boiling points in excess of 140° C. and an acrylic group as a polymerizable unit.

Examples of suitable bifunctional comonomers are 1,4-divinylbenzene, or the di(meth)acrylates of alkylene glycols such as ethylene glycol, diethylene glycol, tetraethylene glycol, 1,2-propanediol, 1,4- or 1,3-butanediol, dimethylpropanediol, 1,6-hexanediol, neopentyl glycol, or 2-ethyl-2,3-hexanediol. In the case of bifunctional monomers the proportion of methacrylates should also be kept low.

The essential monomers which confer the novel antisoiling characteristics to the poly(meth)acrylate SRCs are (meth)acrylic monomers, particularly (meth)acrylate esters, which contain fluorine-containing alkyl groups, particularly as ester groups, on the (meth)acrylic group. These are described by formula I. Particular examples which might be mentioned are the following:

2-N-ethyl-nonafluorobutanesulfonamidoethyl acrylate, $C_{11}H_{12}F_9NO_4S$;
4-N-methyl-nonafluorobutanesulfonamidobutyl acrylate, $C_{12}H_{14}F_9NO_4S$;
2-N-ethyl-tridecafluorohexanesulfonamidoethyl acrylate, $C_{13}H_{12}F_{13}NO_4S$;
2-N-ethyl-pentadecafluoroheptanesulfonamidoethyl acrylate, $C_{14}H_{12}F_{15}NO_4S$;
2-N-methyl-heptadecafluorooctanesulfonamidoethyl acrylate, $C_{14}H_{10}F_{17}NO_4S$;
2-N-methyl-heptadecafluorooctanesulfonamidoethyl methacrylate, $C_{15}H_{12}F_{17}NO_4S$;
2-N-methyl-tridecafluorooctanesulfonamidoethyl acrylate, $C_{14}H_{14}F_{13}NO_4S$;
2-N-ethyl-heptadecafluorooctanesulfonamidoethyl acrylate, $C_{15}H_{12}F_{17}NO_4S$;
2-N-ethyl-heptadecafluorooctanesulfonamidoethyl methacrylate, $C_{16}H_{14}F_{17}NO_4S$;
2-N-propyl-heptadecafluorooctanesulfonamidoethyl methacrylate, $C_{17}H_{16}F_{17}NO_4S$;
2-N-butyl-heptadecafluorooctanesulfonamidoethyl acrylate, $C_{17}H_{16}F_{17}NO_4S$;
4-N-methyl-heptadecafluorooctanesulfonamidobutyl acrylate $C_{16}H_{14}F_{17}NO_4S$;
2-N-methyl-pentacosafluorotridecylsulfonamidoethyl acrylate $C_{19}H_{12}F_{25}NO_4S$.

Examples of additional fluorinated-alkyl-group-containing (meth)acrylate monomers which may be used according to the invention are compounds of formula II, which contribute particularly to good flow characteristics of the coating composition during application, and which are used advantageously in combination with the above-mentioned fluorine-containing monomers of formula I, are the following:
2,2,2-trifluoroethyl methacrylate;
2,2,3,3-tetrafluoropropyl acrylate;
2,2,3,3-tetrafluoropropyl methacrylate;
2,2,3,4,4,4-hexafluorobutyl acrylate;
2,2,3,4,4,4-hexafluorobutyl methacrylate; nonadecafluoroisodecyl methacrylate;
2,2,3,3,4,4,4-heptafluorobutyl acrylate; and
2,2,3,3,4,4,5,5,6,6,7,7,7-tridecafluoroheptyl acrylate.

The fluorinated-alkyl-group-containing monomers are known compounds. Together, can generally be represented by the formula

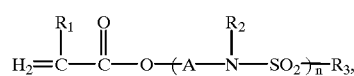

III where $R_1$ represents H or $CH_3$;
A represents an alkylene group with 2–6 carbons atoms;
$R_2$ represents H or an alkyl group with 1–4 carbon atoms;
$R_3$ represents $C_aH_bF_c$,
where a=2–30; b=0–4; c=2a+1−b; and n=0 or 1.

Examples of fluorinated-aryl-group-containing (meth) acrylate monomers which may optionally be used along with other components in the inventive coating compositions, particularly in combination with fluorine-containing compounds of formula I, are 2,3,5,6-tetrafluorophenyl acrylate and 2,3,5,6-tetrafluorophenyl methacrylate.

The fluorine-containing (meth)acrylate monomers which confer good flow properties according to the invention on the coating compositions containing multifunctional (meth) acrylates and confer anti-soiling and anti-graffiti characteristics on the resulting poly(meth)acrylate-based SRCs are present in the coating composition in the amount of 0.1–60 wt. %, preferably 0.1–40 wt. %, preferably 0.5–20 wt. %, more preferably 0.5–10 wt. %, and particularly 0.5–5 wt. % (based on the total weight of all polymerizable compounds).

UV-protective compositions of the type known to be usable as plastics additives ("Ullmanns Encyklopaedie der technischen Chemie", 4th Ed., Vol. 15, pp. 253–260), when mixed into the composition, and/or, advantageously, polymerizable UV-stabilizers, provide improved weather resistance to the inventive coatings. A non-limiting example of a polymerizable UV-stabilizer which may be mentioned is 3-(2-benzotriazolyl)2-hydroxy-5-tert-octylbenzyl-ethacrylamide.

The viscosity of the coating mixture and the properties of the cured coating are affected by the ratio of the various monomer types in the mixture. The greatest scratch resistance is contributed by the tri- and multifunctional monomers, but these also confer brittleness. Preferably their proportion is ≧30 wt. %. The total amount of bifunctional monomers, which also contribute to scratch resistance of the resulting coated plastic articles, plus the amount of monofunctional monomers, including the fluorine-containing comonomers, generally does not exceed 70 wt. %. UV-protective compositions are employed in the amount of 1–10 wt. % based on the weight of the monomers forming the coating.

The coating composition can be cured by means of thermally decomposable initiators such as peroxides or azo compounds. Advantageously, however, it is cured with UV light in the presence of known photoinitiators. The curing temperatures are generally in the range 0–50° C., particularly in the neighborhood of 20° C. (room temperature curing). For improved incipient dissolution of the substrate for adhesion, organic solvents such as methyl ethyl ketone may be added to the coating composition. Solvent-free coating compositions are preferred. Antioxidants, other customary additives, or polymers such as polyester resins, may be added as desired.

The coating composition may be applied by various techniques, such as dipping, pouring, spraying, or roll application, in a discontinuous or continuous fashion, to the plastic articles, in coating thicknesses of 1–100 micron, preferably 2–50 micron. It is advantageous to coat extruded plastic articles immediately following extrusion, preferably while the plates are still at a relatively high temperature but below the glass temperature of the plastic substrate, using a continuous coating process. ordinarily the coating composition is cured at temperatures below the glass transition temperature of the plastic being coated. To exclude polymerization-inhibiting oxygen, the polymerization may be carried out under an inert gas, for example, nitrogen. The curing time is on the order of seconds to minutes, e.g. 5–1000 sec, and essentially depends on the temperature attained by the coating composition, which temperature depends upon the temperature of the substrate being coated and upon other factors.

Having generally described this invention, a further understanding can be obtained by reference to certain specific examples which are provided herein for purposes of illustration only and are not intended to be limiting unless otherwise specified.

EXAMPLE 1

A base coating mixture was prepared from 39 parts by weight (pbw) pentaerythritol tetraacrylate, 59 pbw hexanediol diacrylate, and 2 pbw Darocur® 1116 (a thermoplastic bisphenol-A polycarbonate). To this base coating mixture was added an amount according to Table 1 of (A) 2-(N-ethylperfluorooctanesulfamido)ethyl acrylate; or (B) 2-(N-ethylperfluorooctanesulfamido)ethyl methacrylate.

The mixture was applied to plates of Makrolon® 281 (a thermoplastic bisphenol-A polycarbonate) by means of a spiral doctor applicator, to give a wet film thickness of 12 micron. After 1 min settling time the coating was hardened using a high pressure mercury lamp (model F450, available from Fusion Systems), at 1 m/min advance speed, under a nitrogen atmosphere. The anti-graffiti characteristic was evaluated by spraying with ordinary commercial acrylic automotive paint. The evaluation was in the range of "poor" to "very good", as follows:

Poor anti-graffiti characteristic:
Paint completely wets the surface and adheres well. Paint cannot be removed without solvent.

Very good anti-graffiti characteristic:
Paint immediately collects into individual droplets. No film is formed. Dried paint can be wiped off.

TABLE 1

| Basic Coating Composition Mixture (wt. %) | Additional Monomer (wt. %) | Contact Angle (Degrees) Water | Contact Angle (Degrees) White Oil | Anti-graffiti Characteristics | Taber Test (% haze) |
|---|---|---|---|---|---|
| 100 | — | 70.4 | <10 | Poor | 1.6 |
| 99.8 | 0.2 A | 71.0 | 14.3 | Low | 1.2 |
| 99.6 | 0.4 A | 74.5 | 37.5 | Moderate | 1.1 |
| 99.2 | 0.8 A | 86.5 | 45.0 | Good | 2.0 |
| 98.4 | 1.6 A | 92.0 | 52.0 | Very Good | 2.2 |
| 93.3 | 3.2 A | 100.0 | 59.0 | Very Good | 2.6 |
| 99.8 | 0.2 B | 73.6 | 34.6 | Low | 1.6 |
| 98.4 | 1.6 B | 95.5 | 43.5 | Very Good | 1.9 |

EXAMPLE 2

A second base coating mixture was prepared from 38 pbw pentaerythritol tetraacrylate, 58 pbw hexanediol diacrylate, 2 pbw 2-(N-ethylperfluorooctanesulfamido)ethyl acrylate, and 2 pbw Darocur® 1116. To this base coating mixture were added the additional comonomers as indicated in Table 2, was applied as a coating and cured as described in Example 1. Then various surface irregularities which depend on the coating were evaluated visually.

TABLE 2

| Basic Flowable Coating Composition Mixture (wt. %) | Additional Monomer | (wt. %) | Surface Regularity (optics) | Taber Test (haze %) |
|---|---|---|---|---|
| 100 | — | — | Wavy | 1.6 |
| 90 | A | 10 | Good | 1.8 |
| 80 | A | 20 | Very Good | 1.6 |
| 90 | B | 10 | Good | 2.0 |
| 80 | B | 20 | Very Good | 2.2 |

Monomer (A) in Table 2 is 2,2,2-trifluoroethyl methacrylate.
Monomer (B) in Table 2 is 2,2,3,3-tetrafluoropropyl methacrylate.

EXAMPLE 3

The base coating mixture of Example 1, with 2 wt. % 2-(N-ethylperfluorooctanesulfamido)ethyl acrylate, was applied to a Makrolon® 281 substrate in a reverse roll coating process, and was cured with a high pressure mercury lamp (100 W/cm, supplied by the firm Meyer-Miserd), under $N_2$. The optically flawless surface had good scratch resistance in a steel wool test, and after several months of weathering in the open it still had good anti-graffiti characteristics (see Example 1).

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A non-aqueous, polymerizable coating composition suitable for polymerizing to a scratch-resistant, weather-resistant, soil-resistant coating on a molded article, consisting essentially of the components:

(a) at least 30 wt. %, based on the total weight of all polymerizable monomers, one or more multifunctional (meth)acrylate monomers, said multifunction comprising three or more polymerizable carbon-carbon double-bonds;

(b) 0.5–5 wt. %, based on the total weight of all polymerizable monomers, of one or more surface-active fluorinated-alkyl-group-containing (meth)acrylate monomers having the formula:

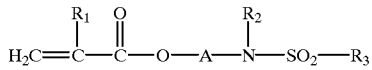

where $R_1$ represents H or $CH_3$;
   A is an alkylene group of 2–6 carbon atoms;
   $R_2$ is an alkyl group of 1–4 carbon atoms;
   $R_3$ is $C_aH_bF_c$, where a, b, and c are integers, and a=2–20, b=0–4, and c=2a+1−b;

(c) optionally other monoethylenically unsaturated comonomers; and (d) optionally, customary additives.

2. A polymer coating composition according to claim 1, wherein 70 weight percent or more of said monomers (a) comprise monomers containing acrylate moieties.

3. The polymerizable coating composition of claim 1, wherein said component (d) comprises a UV protective agent.

4. The polymerizable coating composition of claim 2, wherein said component (d) comprises a UV protective agent.

5. The polymerizable coating composition of claim 3, wherein said UV protecting agent comprises a polymerizable UV protecting agent.

* * * * *

UNITED STATES PATENT AND TRADEMARK OFFICE
CERTIFICATE OF CORRECTION

PATENT NO.    : 6,221,988 B1
DATED         : April 24, 2001
INVENTOR(S)   : Michael Mueller et al.

It is certified that error appears in the above-identified patent and that said Letters Patent is hereby corrected as shown below:

Column 7,
Line 16, "-ethacrylamide" should read -- methacrylamide --.

Column 8,
Line 18 and 19, "Darocur ®1116 (a thermo-plastic bisphenol-A polycarbonate)" should read -- Darocur ®1116 --.

Column 9,
Line 21, "Meyer-Miserd" should read -- Meyer-Miseré --.

Signed and Sealed this

Fifth Day of March, 2002

Attest:

*Attesting Officer*

JAMES E. ROGAN
*Director of the United States Patent and Trademark Office*